(12) United States Patent
Guerreiro et al.

(10) Patent No.: US 10,346,709 B2
(45) Date of Patent: Jul. 9, 2019

(54) OBJECT DETECTING METHOD AND OBJECT DETECTING APPARATUS

(71) Applicant: Applications Solutions (Electronic and Vision) Ltd., Lewes (GB)

(72) Inventors: Rui Guerreiro, Hove (GB); Alexander Sibiryakov, Lewes (GB)

(73) Assignee: APPLICATION SOLUTIONS (ELECTRONICS AND VISION) LTD, Lewes (GB)

( * ) Notice: Subject to any disclaimer, the term of this patent is extended or adjusted under 35 U.S.C. 154(b) by 86 days.

(21) Appl. No.: 15/652,302

(22) Filed: Jul. 18, 2017

(65) Prior Publication Data

US 2017/0316278 A1   Nov. 2, 2017

Related U.S. Application Data

(63) Continuation of application No. PCT/EP2015/078954, filed on Dec. 8, 2015.

(30) Foreign Application Priority Data

Jan. 21, 2015  (EP) .................................... 15151974

(51) Int. Cl.
G06K 9/46     (2006.01)
G06K 9/00     (2006.01)
(Continued)

(52) U.S. Cl.
CPC ....... *G06K 9/4604* (2013.01); *G06K 9/00805* (2013.01); *G06K 9/6232* (2013.01);
(Continued)

(58) Field of Classification Search
CPC ................ G06T 7/0042; G06T 7/0022; G06T 2207/30261; G06T 2207/30241;
(Continued)

(56) References Cited

U.S. PATENT DOCUMENTS

| | | | |
|---|---|---|---|
| 2007/0003165 A1* | 1/2007 | Sibiryakov | .......... G06K 9/6211 382/294 |
| 2010/0119160 A1* | 5/2010 | Sibiryakov | .......... G06K 9/4647 382/209 |
| 2013/0222589 A1 | 8/2013 | Lalonde et al. | |

FOREIGN PATENT DOCUMENTS

| | | |
|---|---|---|
| EP | 1830321 A2 | 9/2007 |
| EP | 1964719 A2 | 9/2008 |
| EP | 2233358 A1 | 9/2010 |

OTHER PUBLICATIONS

International Preliminary Report on Patentability dated Apr. 11, 2017 from corresponding International Patent Application No. PCT/EP2015/078954.

(Continued)

*Primary Examiner* — Duy M Dang

(57) ABSTRACT

An enhanced object detecting method and apparatus is presented. A plurality of successive frames is captured by a monocular camera and the image data of the captured frames are transformed with respect to a predetermined point of view. For instance, the images may be transformed in order to obtain a top-down view. Particular features such as lines are extracted from the transformed image data, and corresponding features of successive frames are matched. An angular change of corresponding features is determined and boundaries of an object are identified based on the angular change of the features.

8 Claims, 3 Drawing Sheets

(51) Int. Cl.
    *G06T 7/73*     (2017.01)
    *G06K 9/62*     (2006.01)
(52) U.S. Cl.
    CPC ...... *G06T 7/73* (2017.01); *G06T 2207/10016* (2013.01); *G06T 2207/30261* (2013.01)
(58) Field of Classification Search
    CPC ......... G06T 7/55; G06T 3/0068; G06T 15/04; G06T 7/001; G06T 2207/30252; G06T 2207/30236; G06T 7/73; G06T 7/50; G06K 9/00; G06K 9/00805; G06K 9/6202; G06K 9/6279; G06K 9/00785; G06K 9/00791; G06K 9/00228; A63F 13/327; A63F 13/213; A63F 13/25; A63F 13/32; A63F 13/332; A63F 13/335; A63F 13/655; A63F 13/00; G01S 13/90; G01S 17/89; G01C 21/3602; B60K 31/00; B60K 37/06; G06F 3/013; G06F 3/0304
    See application file for complete search history.

(56)         References Cited

OTHER PUBLICATIONS

European Search Report dated Jul. 24, 2015 for corresponding European Patent Application No. 15151974.1.

* cited by examiner

OBJECT DETECTING METHOD AND OBJECT DETECTING APPARATUS

CROSS REFERENCE TO RELATED APPLICATION

This application claims the benefit of International application No. PCT/EP2015/078954, filed Dec. 8, 2015, which claims priority to European application No. 15151974.1, filed Jan. 21, 2015, each of which is hereby incorporated by reference.

TECHNICAL FIELD

The technical field relates generally to an object detecting method and an object detecting apparatus and specifically to an object detecting method and apparatus for detecting an object in image data captured by a monocular camera.

BACKGROUND

Detecting obstacles in the environment of a vehicle becomes important, for instance, in advanced driver assistance systems ("ADAS"). There are currently different approaches for detecting obstacles in images. For example, stereo cameras, ultrasound or equivalent detection means enable reliable estimation of a three-dimensional environment. However, this approach requires complex and expensive hardware. Alternatively, monocular approaches may be used for detecting obstacles. For instance, static approaches may detect objects within a single image by using assumptions about properties of an object. However, these assumptions often fail. Further, a structure from motion ("SFM") may be used for estimating three-dimensional properties of an image. These approaches rely on the assumption that the objects in a scene are static. Otherwise, the objects become unpredictable if the scene is not static. Hence, these assumptions are not very reliable and require high computational costs.

As such, it is desirable to present an improved approach for detecting objects in an image. In particular, there is a need for a reliable detecting of objects in images captured by a monocular camera. In addition, other desirable features and characteristics will become apparent from the subsequent summary and detailed description, and the appended claims, taken in conjunction with the accompanying drawings and this background.

BRIEF SUMMARY

According to a first aspect, the present disclosure provides an object detecting method comprising obtaining first image data of a first frame captured by a camera at a first point in time; transforming a point of view of the first image data to a predetermined point of view to obtain transformed first image data; extracting first features from the transformed first image data; obtaining second image data of a second frame captured by the camera at a second point in time different from the first point in time; transforming a point of view of the second image data to the predetermined point of view to obtain transformed second image data; extracting second features from the transformed second image data; matching the extracted first features and the extracted second features; computing an angular change between matched first features and second features; and detecting an object based on the determined angular change between a matched first features and second features.

According to a further aspect, the present disclosure provides an object detecting apparatus, comprising a camera adapted to provide first image data of a first frame captured at a first point in time, and second image data of a second frame captured at a second point in time different from the first point in time. The object detecting apparatus further comprises an image data transforming unit adapted to transform a point of view of the first image data and a point of view of the second image data to a predetermined point of view; a feature extractor adapted to extract first features from the transformed first image data, and to extract second features from the transformed second image data; a feature matching unit adapted to match the extracted first features and the extracted second features; an angle computing unit adapted to compute an angular change between the matched first features and second features; and an object detector adapted to detect an object based on the determined angular change between a matched first features and second features.

The present disclosure takes into account that even small details of an object are magnified/stretched when transforming an almost horizontal view to a top-down view. In particular, an approximately vertical border of an object in an original image is transformed to a line segment on the top-down view image that points to a pixel in the bottom-center in the transformed image. Accordingly, vertical elements of objects lead to line segments pointing approximately at the bottom center of the object, wherein the angle of such a line changes when the camera moves towards to the object. Hence, vertical elements of an object can be identified by observing the angular change of features in a top-down view image.

In a top-down view image features such as line segments formed by stretching object data change their direction/angle as the camera progresses. However, details on the ground, such as shadows, do not. This property can be used to detect objects on monocular images.

The present disclosure can be applied to both static images as well as dynamic images. An idea underlying the present disclosure is to detect features, for example line segments, in image data, detecting which features in a frame correspond to which features in another frame captured at a different point in time, and estimating an angular change of the features. If the angle of a particular feature changes consistently over successive images, an object boundary is detected, and the lower point of such feature is considered as the start of the object.

According to an embodiment of the object detecting method, the extracting first details from the transformed first image data and the extracting second details from the transformed second image data comprise identifying lines in the first image data and the second image data, respectively. Identifying lines in image data can be easily performed by a single algorithm. Since an almost straight border of an object corresponds to a line in the transformed image data, borders of an object can be easily identified by extracting lines in the image data.

According to a particular embodiment of the object detecting method, the identifying of lines is based on a Hough-style transform. Such a Houge-style transform is a very reliable and a stable method for identifying lines in image data.

According to a further embodiment of the object detecting method, the detecting an object comprises determining a distance between the camera and the detected object. For instance, such a distance between the camera and the detected object can be determined based on an end point of a feature in the image data. Since such an end point of a feature, in particular the lowest point of a feature in the image data is considered as the bottom of an object, a distance between the camera and the object can be easily determined.

According to a further embodiment of the object detecting method, the method further comprises a step of determining an ego motion of the camera. Based on the determined ego motion of the camera, the detection of an object is further based on the detected ego motion of the camera. In this way, changes in the image data based on the motion of the camera can be compensated and the reliability/quality of the detected objects can be improved.

According to an embodiment of the object detecting apparatus, the camera is a monocular camera. Monocular cameras are broadly available. Further, monocular cameras are less expensive than complex three-dimensional detecting means such as, for instance, stereoscopic cameras. Hence, the costs for an object detecting apparatus can be reduced.

According to a further embodiment of the object detecting apparatus, the camera comprises a fish-eye lens. Image data captured by a camera comprising a fish-eye lens are very suitable for detecting objects according to the present invention.

According to a further embodiment of the object detecting apparatus, the apparatus comprises a position detector adapted to determine a position and/or orientation of the camera. In particular, the position detector determines the position/orientation of the camera at the point of time when the camera is capturing a frame. For instance the position detector may detect an ego-motion of the camera. Further, the angle computing unit is adapted to compute a change of position and/or orientation of the camera between the first point in time and the second point in time. Additionally, the object detector is adapted to detect the object based on the computed change of position and/or orientation of the camera between the first point in time and the second point in time. In this way, ego-motion such as linear and/or angular movement of the camera can be compensated.

According to a further aspect, the present disclosure provides an advanced driver assistance system comprising an object detecting apparatus according to the present invention.

According to still another aspect, the present disclosure provides a computer program product adapted to perform the steps of the object detecting method.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
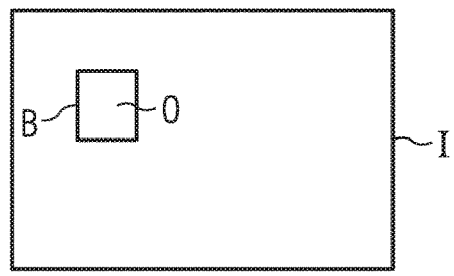
FIG. 1 shows a schematical illustration of an image captured by a camera according to an embodiment.

FIG. 1 illustrates an image I captured by an image capturing device, for instance a camera. For a better understanding of the disclosure, image I comprises only a single object O. However, the present disclosure may be also applied for image data comprising a plurality of objects. The object O illustrated in the image I comprises an edge B. This edge B may relate to a vertical edge of object O.

Figure 2:
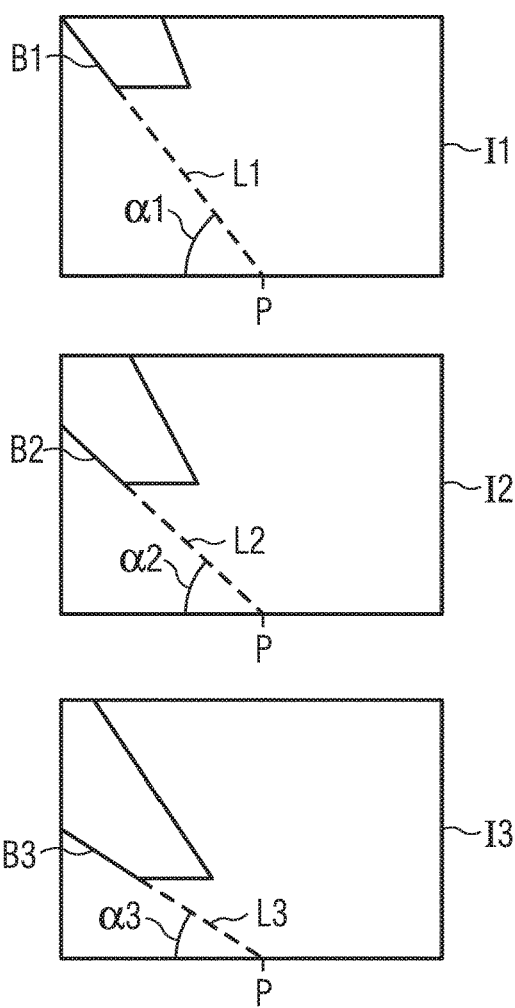
FIG. 2 shows transformed image data according to an embodiment.

FIG. 2 illustrates image data of an image I1 after transforming the point of view of image I illustrated in FIG. 1. Image I of FIG. 1 may be captured by a camera having a first distance between the camera and object O. Such an image I may be captured, for instance that a first point in time t1. As can be seen, the edge B of the object O in FIG. 1 has been transformed to a line segment B1. This line segment B1 is continued by dashed line L1. In case edge B of object O relates to a vertical line of the object O, line L1 crosses the lower border of image I1 at point P. This point P relates approximately to a pixel in the bottom center of the transformed image data.

The image data if image I2 illustrated in FIG. 2 relate to a transform of a further image captured at a shorter distance between the camera and the object O. Such an image may be captured, for instance at a further point in time t2. As can be seen in the image data of image I2, the orientation of the line segment B2 relating to the edge B of object O has been changed. Line segment B2 is continued by a dashed line L2. As can be seen, a line L2 crosses the bottom border of image I2 approximately at the same bottom center point P as in image I1. However, the angle between the lower border of the image and line L1 and L2, respectively, has been changed from α1 to α2.

When capturing a further image having still a shorter distance between camera and object O, transformation of this image will lead to image data of Image I3 illustrated in FIG. 2. As can be seen in this image I3, the edge B of the object O will be transformed to line segment B3. Line segment B3 is continued by a line L3, which crosses the bottom border of image I3 approximately at the same point P. The angle between the bottom border of image I3 and line L3 has been further changed to α3.

Hence, by analyzing features in the transformed image data, it is possible to identify those features pointing to a common point P in the transformed images I1-I3. The lowest point of such a feature, for instance a line segment B1-B3 as illustrated in FIG. 2, may be considered as the bottom point of an object. Based on the assumption that such a bottom point may be located at the ground, it is possible to determine the distance between such a bottom point and the camera. Hence, the distance between the object O and the camera can be determined. For this purpose, the distance can be determined based on the knowledge of the image properties of the camera. For instance, it can be assumed that each pixel of the captured image data relate to a particular area, having a predetermined size. Based on the size of such an area, the distance between the object O and the camera can be easily determined.

Figure 3:
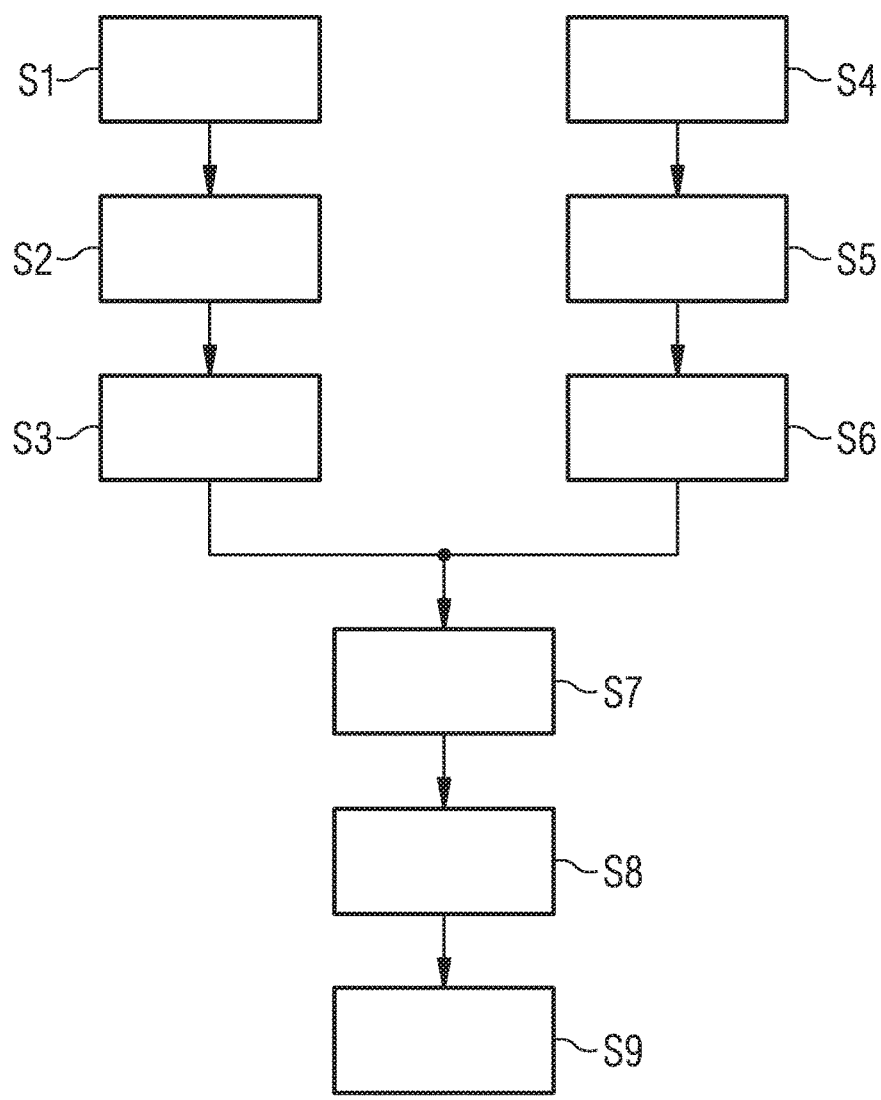
FIG. 3 shows a flowchart of a method underlying a further embodiment.

FIG. 3 illustrates a flowchart underlying an embodiment of an object detecting method. In a first step S1, first image data of a first frame are obtained. The image data of the first frame may be captured by a camera at a first point in time. In particular, the image data may be captured by a camera having a first position.

In step S2 the obtained first image data are processed in order to transform the point of view of the first image data to a predetermined point of view. For instance, the point of view of the transformed image data may be changed in order to obtain a top-down view. By transforming the point of view of the image data, a top-down view of a camera may be simulated, i.e., a view as if the scene was being observed from a high position is achieved. In this way, even small details of an object may be greatly magnified/stressed in the top-down view.

Next, in step S3 first features are extracted from the transformed first image data. For instance, the first features may relate to line segments. Such line segments may relate to edges of objects. However, other features may be also extracted. For instance, elements having a particular shape may be identified. The features of the transformed image data may be extracted, for instance by analyzing a shape of an element. Other methods for identifying features in the image data are also possible.

In step S4, second image data from a second frame are obtained. The second frame may be captured by a camera at a second point in time. The second point in time may be different from the first point in time when capturing the first frame. In particular, the position of the camera and/or the orientation of the camera when capturing the second frame may be different from the position and/or orientation of the camera when capturing the first frame.

Subsequently, the point of view of the second image data is transformed to the predetermined point of view in step S5. The predetermined point of view when transforming the second image data is the same as the point of view when transforming the first image data.

In step S6 second features are extracted from the transformed second image data. The extracting of the features from the transformed second image data is performed in the same manner as extracting first features from the transformed first image data.

Subsequently, the extracted first features and the extracted second features are matched in step S7. In this step, features, for instance line segments, are identified which may relate to a same element in the first frame and the second frame. In order to detect features in the transformed first image data corresponding to features in the transformed second image data the characteristics of the individual features may be compared. For instance, a length of a line segment may be analyzed. Further, a transition type may be evaluated, for instance a transition from a dark to a bright edge or a bright to a dark edge can be analyzed in order to identify corresponding features. Further, an analysis of a slope or further characteristics are also possible in order to identify corresponding features in transformed first image data and the transformed second image data.

In step S8, an angular change between matched first features and second features is computed. If an angle of a particular feature changes consistently over the time, such a feature may be considered as an object boundary. In this case, a lower point of such a feature may be considered as a start point of the object. Accordingly, in step S9, an object can be detected based on the determined angular change between the matched first features and second features.

In order to enhance the reliability and accuracy of the object detecting method, further image data of additional frames may be obtained and processed in the same manner as the image data of the first and the second frame. In this way, the angular change of a feature can be observed over a longer period of time. If the angular change of a feature is consistent during a predetermined number of successive frames, such a feature may be considered as a boundary of an object. Otherwise, if the angular change is not consistent over a predetermined number of successive frames, the corresponding feature will be skipped and not considered as a boundary of an object.

Figure 4:
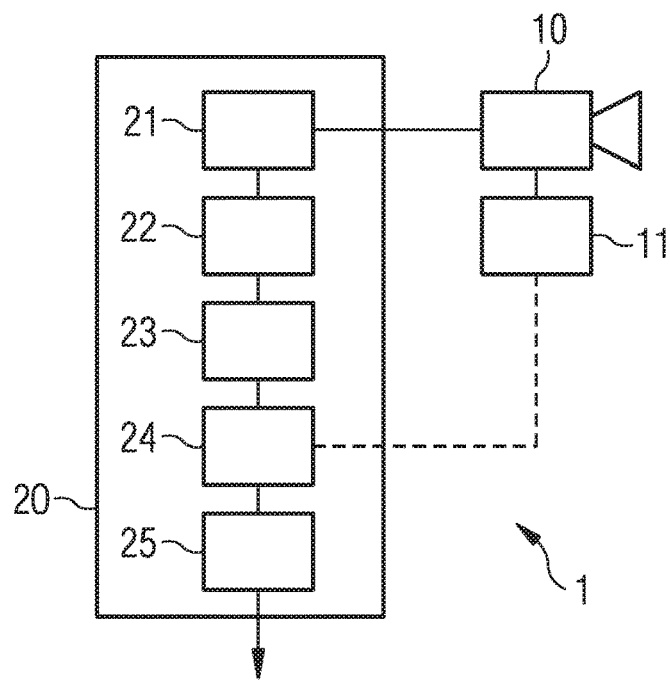
FIG. 4 shows an object detecting apparatus according to an embodiment.

FIG. 4 illustrates a block diagram of an embodiment for an object detecting apparatus 1. The object detecting apparatus 1 may comprise a camera 10 and a processor 20. Camera 10 may be a monocular camera. The camera may capture monochromatic or coloured images. Additionally or alternatively, it is also possible to capture infrared or ultraviolet images. Camera 10 may comprise a fish-eye lens. In this way, a large field of view can be captured by a single camera. In order to extend the field of view, it may be also possible to use a plurality of cameras 10 in parallel and to merge the image data of all these cameras 10 to a single frame for a further processing. For this purpose, the capturing of image data of all these cameras may be synchronized.

Camera 10 may further comprise a position detector 11. This position detector 11 may determine a position and/or an orientation of camera 10. For instance, position detector 11 may comprise a GPS receiver, an electronic compass or a gyroscope. Further means for determining a position and/or an orientation of camera 10 may be possible, too. Alternatively, ego-motion of the camera or a related device may be provided by an external device, for instance an advanced driver assistance system of a vehicle.

The image data captured by camera 10 and optionally the position/orientation data are provided to processor 20. Processor 20 comprises an image data transforming unit 21, a feature extractor 22, a feature matching unit 23, an angle computing unit 24, and an object detector 25. Image data transforming unit 21, feature extractor 22, feature matching unit 23, angle computing unit 24 and object detector 25 may be realized by software components which are executed by a microprocessor of processor 20. Alternatively, image data transforming unit 21, feature extractor 22, feature matching unit 23, angle computing unit 24 and object detector 25 may be realized as separate processing components in processor 20. Additionally, processor 20 may comprise at least one memory for storing intermediate results. For instance, previously captured image data, transformed image data and/or extracted features or a determined angle of an extracted feature may be stored in a memory of processor 20.

After camera 10 has captured an image, the corresponding image data are provided to a processor 20. The image data may be received by image data transforming unit 21. Image data transforming unit 21 performs a processing in order to transform a point of view of the image data to a predetermined point of view. In particular, the point of view of the obtained image data may be changed to obtain a top-down view of the captured scene. Subsequently, feature extractor 22 processes the transformed image data to extract at least one feature from the transformed image data. For instance, feature extractor 22 may analyze the transformed image data 2 to identify line segments. Additionally or alternatively, further features may be identified, too. The extracted features of the transformed image data are provided to feature matching unit 23. Feature matching unit 23 compares the features extracted from the transformed image data in order to identify similar features in image data of successive frames. For instance, a length of feature, a shape of a feature, a transition from bright to dark or dark to bright or other properties may be analyzed in order to identify corresponding features in successive image data.

After corresponding features in successive image data have been identified, these features are provided to angle matching unit 24. Angle matching unit 24 computes an angular orientation of the features. For example, the angular orientation with respect to a predetermined line, for instance, the bottom line of an image can be computed.

Object detector 25 analysis the computed angular orientation of the features and compares an angular change of corresponding features in successive image data. Based on this angular change of a feature, object detector 25 determines whether or not a feature may relate to an object, in particular to a boundary of an object in the captured image data. If the angular change of a feature is consistent, the respective feature may be considered as a boundary of an object. In this case, a lower point of the feature may be considered as a starting point of the object. In particular, this starting point at the bottom of the feature may be considered as a base point of the object on the ground. Based on this assumption, namely that the lower point of the object is on the ground, a distance between the object and the camera 10 may be computed. For instance, the number of pixels between the lower point of the feature in the image data, in particular the transformed image data, and a particular point in the image data (the transformed image data) may be computed. Based on the assumption that each pixel in the image data relates to a particular distance, the distance between the camera and the object can be computed. However, other methods for determining a distance between the camera 10 and the object are possible, too.

Even though the object detecting method and apparatus are described with respect to only two successive frames, it is also possible to capture more than two successive frames at different positions, in particular at different points in time and to analyze the angular change of features in a plurality of transformed image data relating to successive frames. In this way, the reliability and the accuracy of the detected objects can be further improved. If the object detecting apparatus 1 comprises a position detector 11, the position and/or orientation of camera 10 can be further considered when analyzing the image data. In particular, an angular change of camera 10 can be identified and considered when analyzing the angular change of the extracted features. In this way, the accuracy of the object detection can be further improved.

Figure 5:
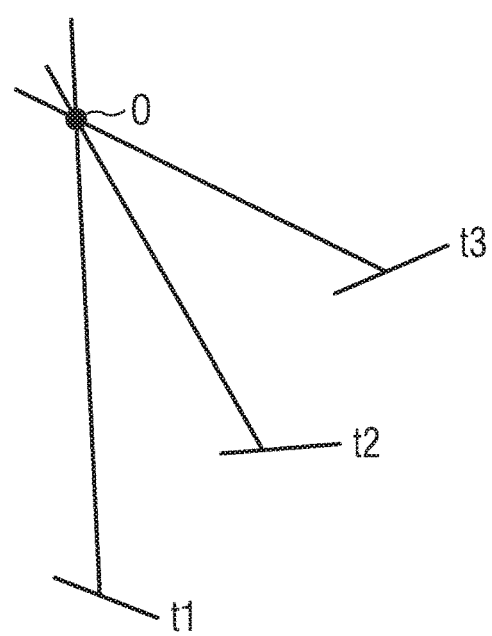
FIG. 5 shows a schematical drawing illustrating an object detecting according to an embodiment.

FIG. 5 shows a schematical illustration of a further object detection according to an embodiment. In this case, three successive frames are captured by a camera 10 at t1, t2 and t3. Further, position and/or orientation of the camera 10 are determined, for instance by a motion detector 11. In this way, the ego-motion of camera 10 can be determined. Based on this ego-motion of the camera, the image data of the captured frames can be compensated accordingly. As can be seen in FIG. 5, all line segments directing to an object should intersect at the point where the object is located after compensating the ego-motion of the camera 10. In order to aggregate all the information of the lines to an object and to determine where the object is, Hough-style transform may be used. In this way, the position of an object can be determined.

The information about one or more objects which are identified in the environment of a camera 10 may be provided, for instance to an advanced driver assistance system of a vehicle. In this way, this information about objects can be used in order to control the vehicle or to provide additional information to a driver of the vehicle. However, the present disclosure is not limited to an object detecting for an advanced driver assistance system or to the use in a vehicle. Further applications for detecting objects by a monocular camera are possible, too.

Summarizing, the present disclosure relates to an enhanced object detecting method and apparatus. A plurality of successive frames is captured by a monocular camera and the image data of the captured frames are transformed with respect to a predetermined point of view. For instance, the images may be transformed in order to obtain a top-down view. Particular features such as lines are extracted from the transformed image data, and corresponding features of successive frames are matched. An angular change of corresponding features is determined and boundaries of an object are identified based on the angular change of the features. In this way, an efficient and reliable identification of objects based on image data of a single monocular camera can be achieved. Disturbances such as shadows of an object can be omitted. Thus, the reliability of the identified objects is improved.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An object detecting method comprising:
   obtaining first image data of a first frame captured by a camera at a first point in time;
   transforming a point of view of the first image data to a predetermined point of view to obtain transformed first image data;
   extracting first features from the transformed first image data;
   wherein the extracting first features from the transformed first image data, comprises identifying lines in the first image data;
   obtaining second image data of a second frame captured by the camera at a second point in time different from the first point in time;
   transforming a point of view of the second image data to the predetermined point of view to obtain transformed second image data;
   extracting second features from the transformed second image data;
   wherein the extracting second features from the transformed second image data comprises identifying lines in the second image data;
   matching the extracted first features and the extracted second features;
   computing an angular change between matched first features and second features comprising computing an angular orientation of the extracted first features and the extracted second features with respect to a predetermined line and comparing an angular change of corresponding features; and
   detecting an object based on the determined angular change between the matched first features and second features.

2. The method according to claim 1, wherein the identifying lines is based on a Hough-style transform.

3. The method according to claim 1, wherein the detecting an object comprises determining a distance between the camera and the detected object.

4. The method according to claim 1, further comprising determining linear and/or angular movement of the camera, wherein the detecting an object is further based on the detected linear and/or angular movement of the camera.

5. An object detecting apparatus, comprising:
   a camera adapted to provide first image data of a first frame captured at a first point in time, and second image data of a second frame captured at a second point in time different from the first point in time;

an image data transforming unit adapted to transform a point of view of the first image data and the second image data to a predetermined point of view;

a feature extractor adapted to extract first features from the transformed first image data and to extract second features from the transformed second image data;

wherein the feature extractor is further adapted to identify lines in the first image data and the second image data;

a feature matching unit adapted to match the extracted first features and the extracted second features;

an angle computing unit adapted to compute angular orientation of the extracted first features and the extracted second features with respect to a predetermined line, and to compute an angular change between matched first features and second features; and an object detector adapted to detect an object based on the determined angular change between the matched first features and second features.

6. The object detecting apparatus according to claim 5, wherein the camera is a monocular camera.

7. The object detecting apparatus according to claim 5, wherein the camera comprises a fish-eye lens.

8. The object detecting apparatus according to claim 5, further comprising a position detector adapted to determine a position and/or orientation of the camera;

wherein the angle computing unit is further adapted to compute a change of position and/or orientation of the camera between the first point in time and the second point in time; and wherein the object detector is adapted to detect the object based on the computed change of position and/or orientation of the camera between the first point in time and the second point in time.

* * * * *